US012488415B2

(12) United States Patent
Xu et al.

(10) Patent No.: US 12,488,415 B2
(45) Date of Patent: Dec. 2, 2025

(54) IMAGE PROCESSING METHOD, RELATED APPARATUS, DEVICE, AND COMPUTER-READABLE STORAGE MEDIUM

(71) Applicant: Huawei Technologies Co., Ltd., Shenzhen (CN)

(72) Inventors: Bei Xu, Xi'an (CN); Kai Liu, Xi'an (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 133 days.

(21) Appl. No.: 18/261,564

(22) PCT Filed: Jan. 17, 2022

(86) PCT No.: PCT/CN2022/072260
§ 371 (c)(1),
(2) Date: Jul. 14, 2023

(87) PCT Pub. No.: WO2022/152284
PCT Pub. Date: Jul. 21, 2022

(65) Prior Publication Data
US 2024/0087081 A1 Mar. 14, 2024

(30) Foreign Application Priority Data
Jan. 18, 2021 (CN) .......................... 202110064642.8

(51) Int. Cl.
*G06T 3/40* (2024.01)
*G06T 7/13* (2017.01)
(Continued)

(52) U.S. Cl.
CPC ................. *G06T 3/40* (2013.01); *G06T 7/13* (2017.01); *G06T 7/50* (2017.01); *G06T 7/60* (2013.01);
(Continued)

(58) Field of Classification Search
CPC .... G06T 7/13; G06T 3/40; G06T 7/50; G06T 7/60; G06T 7/73; G06T 2207/20132;
(Continued)

(56) References Cited

U.S. PATENT DOCUMENTS 8,094,132 B1 * 1/2012 Frischling ............. G06F 3/0481
345/173
9,405,500 B1 * 8/2016 Cox ....................... G06F 1/1647
(Continued)

FOREIGN PATENT DOCUMENTS

CN        101426078 B    1/2011
CN        101496065 B    5/2012
(Continued)

OTHER PUBLICATIONS

ITU-T H.263,Series H:Audiovisual and Multimedia Systems Infrastructure of audiovisual services—Coding of moving video,Video coding for low bit rate communication,(Jan. 2005),total 226 pages.
(Continued)

*Primary Examiner* — Phi Hoang
(74) *Attorney, Agent, or Firm* — Conley Rose, P.C.

(57) ABSTRACT

An image processing method includes a first device that receives request information from a second device The first device obtains location information of M key points in a to-be-transmitted image and determines a target display area in the to-be-transmitted image based on the request information and the location information of the M key points and the first device sends target display area information to the second device to enable the second device to process the to-be-transmitted image into a target display image based on the target display area information. The second device receives the target display area information, processes the transmitted image into the target display image based on the target display area information, and presents the target display image on a display area of the second device.

18 Claims, 8 Drawing Sheets

(51) Int. Cl.
*G06T 7/50* (2017.01)
*G06T 7/60* (2017.01)
*G06T 7/73* (2017.01)

(52) U.S. Cl.
CPC ...... *G06T 7/73* (2017.01); *G06T 2207/20132* (2013.01)

(58) Field of Classification Search
CPC ......... G06T 3/4092; G06T 7/11; H04N 7/147; H04N 2007/145; H04N 21/4314; H04N 21/440245; H04N 21/44008; H04N 21/41407; H04N 21/4788; G06F 9/451
See application file for complete search history.

(56) References Cited

U.S. PATENT DOCUMENTS

| | | | |
|---|---|---|---|
| 2006/0139371 A1* | 6/2006 | Lavine | G06F 3/14 345/620 |
| 2013/0069980 A1 | 3/2013 | Hartshorne et al. | |
| 2017/0024087 A1* | 1/2017 | Pathy | H04L 51/10 |
| 2017/0105009 A1 | 4/2017 | Jeong et al. | |
| 2019/0188889 A1* | 6/2019 | Kumar | G06T 11/60 |
| 2019/0370546 A1* | 12/2019 | Agarwal | G06V 20/20 |
| 2020/0279439 A1* | 9/2020 | Callaghan | A61M 5/20 |

FOREIGN PATENT DOCUMENTS

| | | |
|---|---|---|
| CN | 108154515 A | 6/2018 |
| CN | 104363509 B | 11/2018 |

OTHER PUBLICATIONS

ITU-T H.264,Series H:Audiovisual and Multimedia Systems Infrastructure of audiovisual services—Coding of moving video,Advanced video coding for generic audiovisual services,(Jun. 2019),total 836 pages.

ITU-T H.265,Series H:Audiovisual and Multimedia Systems Infrastructure of audiovisual services—Coding of moving video, High efficiency video coding,(Nov. 2019),total 712 pages.

* cited by examiner

IMAGE PROCESSING METHOD, RELATED APPARATUS, DEVICE, AND COMPUTER-READABLE STORAGE MEDIUM

CROSS-REFERENCE TO RELATED APPLICATIONS

This is a U.S. National Stage of International Patent Application No. PCT/CN2022/072260 filed on Jan. 17, 2022, which claims priority to Chinese Patent Application No. 202110064642.8 filed on Jan. 18, 2021, both of which are hereby incorporated by reference in their entireties.

TECHNICAL FIELD

The present invention relates to the field of image processing, and in particular, to an image processing method, a related apparatus, a device, and a computer-readable storage medium.

BACKGROUND

Currently, there are various forms of smart terminals in the market, including a mobile phone, a tablet computer, a smart watch, a smart pocket watch, and the like. An interconnection and interworking technology between a plurality of terminals gradually starts to develop. Multimedia resource interworking, for example, picture viewing, wallpaper synchronization, remote shutter, video chat, and live streaming, is often required between terminals of different forms. However, screens (resolutions and sizes) of different types of terminals are different. Therefore, it is necessary to convert and adapt multimedia to achieve best display effect.

At present, there are mainly two ways to transmit and convert multimedia resources between a plurality of terminals. One way is to use H.263 to encode and transmit the multimedia resources, and H.263 is mainly used in a video conference, a video call, and a network video. In terms of compressing a progressively scanned video source, H.263 greatly improves performance compared with video coding standards earlier than H.263, and especially at a low bit rate end, H.263 can greatly save the bit rate while ensuring specific quality. However, use of H.263 to encode and transmit the multimedia resources can only resolve a difference in a screen resolution between a source terminal and a target terminal and transmission performance, but cannot resolve a difference in a screen shape between the source terminal and the target terminal. The other way is to display content displayed on a screen of a terminal on a screen of another terminal through screen projection. In this way, multimedia sharing between different screens is implemented based on video encoding and decoding, but projection of different screen shapes is not supported.

SUMMARY

Embodiments of this application provide an image processing method, to resolve a problem that display effect of a multimedia resource on a screen of a target terminal is affected due to an adaptation failure that is of the multimedia resource such as a transmitted image or video on the screen of the target terminal and that is caused by a difference in screen shapes of a source terminal and the target terminal.

According to a first aspect, an embodiment of this application provides an image processing method. The method includes:

A first device receives request information of a second device, where the request information includes information about a display area of the second device;
 the first device obtains location information of M key points in a to-be-transmitted image;
 the first device determines a target display area in the to-be-transmitted image based on the request information and the location information of the M key points; and
 the first device sends target display area information to the second device, so that the second device processes the to-be-transmitted image into a target display image based on the target display area information, where
 the target display area information includes size information of the target display area and location information of the target display area in the to-be-transmitted image.

In this embodiment of this application, the first device determines the target display area of the to-be-transmitted image based on the information such as a shape of the display area of the second device and the location information of the key points in the to-be-transmitted image, and sends the target display area information to the second device. In this way, the second device can process, based on the target display area information, the image received by the second device, so that the image presents best visual effect in the display area of the second device. This resolves a problem that image presentation effect is affected due to an image adaptation failure caused by different shapes of display areas of two devices.

In a possible implementation, the target display area is a target first cropping window, the target first cropping window is a window selected, based on the request information and the location information of the M key points, from one or more first cropping windows that can include the M key points, the first cropping window is completely covered by the to-be-transmitted image, and a shape of the first cropping window is the same as a shape of the display area of the second device; or
 the target display area is a second area, the second area is an area in which a second cropping window overlaps with the to-be-transmitted image, the second cropping window includes the M key points, the second cropping window is not completely covered by the to-be-transmitted image, and a shape of the second cropping window is the same as the shape of the display area of the second device, or
 the target display area is an area of the to-be-transmitted image.

In this embodiment of this application, a target display area includes the information of all the key points of the to-be-transmitted image. When the target display area is displayed on the display area of the second device, the target display area fits the display area of the second device to a maximum extent, and adapts to the display area of the second device. This resolves a problem that image presentation effect is affected due to an image adaptation failure caused by different shapes of display areas of two devices.

In a possible implementation, that the first device determines a target display area in the to-be-transmitted image based on the request information and the location information of the M key points includes:

The first device determines whether the one or more first cropping windows that can include the M key points exist in the to-be-transmitted image, where the shape of the first cropping window is the same as the shape of the display area of the second device; and if the first device determines that the one or more first cropping windows that can include the M key points exist in the to-be-transmitted image, the first device selects, as the target display area, the target first cropping window from the one or more first cropping windows that can include the M key points; or if the first device determines that the one or more first cropping windows that can include the M key points do not exist in the to-be-transmitted image, the first device analyzes whether the second cropping window exists, where the second cropping window includes the M key points, the second cropping window is not completely covered by the to-be-transmitted image, and the shape of the second cropping window is the same as the shape of the display area of the second device; and if the first device analyzes that the second cropping window exists, the first device uses, as the target display area, the area in which the second cropping window overlaps with the to-be-transmitted image, where the overlapping area is smaller than the area of the to-be-transmitted image; or if the first device analyzes that the second cropping window does not exist, the first device uses the area of the to-be-transmitted image as the target display area.

In this embodiment of this application, the first device determines the target display area, to resolve a problem that image presentation effect is affected due to an image adaptation failure caused by different shapes of display areas of two devices.

In a possible implementation, that the first device selects, as the target display area, the target first cropping window from the one or more first cropping windows that can include the M key points includes:

The first device determines the shape of the first cropping window based on the request information;

the first device determines the one or more first cropping windows in the to-be-transmitted image based on the shape of the first cropping window and locations of the M key points;

the first device selects, as the target first cropping window, a first cropping window with a largest size from the one or more first cropping windows;

the first device determines, as the target display area, an area in which the target first cropping window overlaps with the to-be-transmitted image; and the first device records the target display area information, where the target display area information includes the size information of the target display area and the location information of the target display area in the to-be-transmitted image.

In this embodiment of this application, the first device determines the target display area, and sends the target display area information to the second device. In this way, the second device can process, based on the target display area information, the image received by the second device, so that the image presents best visual effect in the display area of the second device. This resolves a problem that image presentation effect is affected due to an image adaptation failure caused by different shapes of display areas of two devices.

In a possible implementation, that the first device uses, as the target display area, the area in which the second cropping window overlaps with the to-be-transmitted image includes:

The first device obtains a third cropping window based on the request information, where the third cropping window is a largest cropping window in the to-be-transmitted image, a shape of the third cropping window is the same as the shape of the display area of the second device, the third cropping window is used as a current cropping window, and the enlarged cropping window is the second cropping window;

the first device enlarges, based on the location information of the M key points, a size of the current cropping window by a first value to obtain an enlarged cropping window;

the first device obtains a first straight line, where the first straight line is a straight line that passes through a center point of the to-be-transmitted image in a first direction, and the first direction is a positive direction in which an image is presented in the display area of the second device;

the first device performs, between first boundaries based on a preset step, sliding window scanning on a geometric center of the second cropping window on the first straight line, and determines whether the second cropping window including the M key points exists; and if the first device determines that the second cropping window including the M key points does not exist, repeatedly performs the step that the first device enlarges, based on the location information of the M key points, a size of the current cropping window by a first value to obtain an enlarged cropping window, until the first device determines that the second cropping window including the M key points exists;

the first device determines, as the second area, the area in which the second cropping window including the M key points overlaps with the to-be-transmitted image; and the first device records information about the second area, where the information about the second area includes size information of the second area and location information of the second area in the to-be-transmitted image.

In this embodiment of this application, the first device determines the target display area, and sends the target display area information to the second device. In this way, the second device can process, based on the target display area information, the image received by the second device, so that the image presents best visual effect in the display area of the second device. This resolves a problem that image presentation effect is affected due to an image adaptation failure caused by different shapes of display areas of two devices.

In a possible implementation, that the first device uses, as the target display area, the area in which the second cropping window overlaps with the to-be-transmitted image includes:

the first device obtains a first straight line, where the first straight line is a straight line that passes through a center point of the to-be-transmitted image in a first direction, and the first direction is a positive direction in which an image is presented in the display area of the second device;

the first device obtains a reference point in the to-be-transmitted image, where the reference point is a first intersection point between the first straight line and a boundary of the to-be-transmitted image;

the first device calculates distance values from the reference point to the M key points based on the location information of the M key points, to obtain M first distance values;

the first device selects, as a target key point, a key point corresponding to a largest first distance value;

the first device determines the second cropping window based on the request information, the reference point, the target key point, and the first straight line, where a center point of the second cropping window is on the first straight line;

the first device determines, as the second area, the area in which the second cropping window overlaps with the to-be-transmitted image; and the first device records information about the second area, where the information about the second area includes size information of the second area and location information of the second area in the to-be-transmitted image.

In this embodiment of this application, the first device determines the target display area, and sends the target display area information to the second device. In this way, the second device can process, based on the target display area information, the image received by the second device, so that the image presents best visual effect in the display area of the second device. This resolves a problem that image presentation effect is affected due to an image adaptation failure caused by different shapes of display areas of two devices.

In a possible implementation, that the first device uses the area of the to-be-displayed image as the target display area includes:

The first device determines, based on the request information and the location information of the M key points, that the target display area of the to-be-transmitted image is the to-be-transmitted image; and the first device records size information of the to-be-transmitted image.

In this embodiment of this application, the first device determines the target display area, and sends the target display area information to the second device. In this way, the second device can process, based on the target display area information, the image received by the second device, so that the image presents best visual effect in the display area of the second device. This resolves a problem that image presentation effect is affected due to an image adaptation failure caused by different shapes (such as screens) of display areas of two devices.

According to a second aspect, an embodiment of this application provides an image processing method. The method includes:

A second device sends request information to a first device, where the request information includes information about a display area of the second device;

the second device receives target display area information sent by the first device, where the target display area information includes size information of a target display area and location information of the target display area in the to-be-transmitted image;

the second device processes, based on the target display area information, the image transmitted by the first device into a target display image; and the second device presents the target display image in the display area of the second device.

In this embodiment of this application, the second device processes, based on the target display area information, the image received by the second device, to obtain the target display image that adapts to the display area of the second device. This resolves a problem that image presentation effect is affected due to an image adaptation failure caused by different shapes of display areas of two devices.

In a possible implementation, that the second device processes the to-be-transmitted image into the target display image based on the target display area information includes:

if the target display area is a target first cropping window, the second device crops, based on the target display area information, the image transmitted by the first device, to obtain a cropped image; and the second device scales the cropped image based on a size of the target display area and a size of the display area of the second device, to obtain the target display image; or if the target display area is a second area, the second device crops, based on the target display area information, the image transmitted by the first device, to obtain a cropped image; and the second device scales the cropped image based on a size of the target display area and a size of the display area of the second device, to obtain the target display image; or if the target display area is an area of the to-be-displayed image, the second device scales, based on a size of the image transmitted by the first device and a size of the display area of the second device, the image transmitted by the first device, to obtain the target display image.

In this embodiment of this application, the second device processes, based on the target display area information, the image received by the second device, to obtain the target display image that adapts to the display area of the second device. This resolves a problem that image presentation effect is affected due to an image adaptation failure caused by different shapes of display areas of two devices.

According to a third aspect, an embodiment of this application provides an image processing apparatus. The image processing apparatus is a first device and includes:

a receiving unit, configured to receive request information of a second device;

an obtaining unit, configured to obtain location information of M key points in a to-be-transmitted image;

a determining unit, configured to determine a target display area in the to-be-transmitted image based on the request information and the location information of the M key points;

a sending unit, configured to send the target display area information to the second device, so that the second device processes the to-be-transmitted image into a target display image based on the target display area information.

In a possible implementation, the determining unit includes:

a judging unit, configured to determine whether the one or more first cropping windows that can include the M key points exist in the to-be-transmitted image;

a selection unit, configured to: after the judging unit determines that the one or more first cropping windows that can include the M key points exist in the to-be-transmitted image, select, as the target display area, the target first cropping window from the one or more first cropping windows that can include the M key points;

an analyzing unit, configured to: after the judging unit determines that the one or more first cropping windows that can include the M key points do not exist in the to-be-transmitted image, analyze whether the second cropping window exists;

a first determining unit, configured to: after the analyzing unit analyzes that the second cropping window exists, use, as the target display area, the area in which the second cropping window overlaps with the to-be-transmitted image; and a second determining unit, configured to: after the analyzing unit analyzes that the second cropping window does not exist, use the area of the to-be-transmitted image as the target display area.

In a possible implementation, the selection unit includes:
a shape determining unit, configured to determine the shape of the first cropping window based on the request information;
a third determining unit, configured to determine the one or more first cropping windows in the to-be-transmitted image based on the shape of the first cropping window and locations of the M key points;
a first selection unit, configured to select a first cropping window with a largest size from the one or more first cropping windows as the target first cropping window;
a target display area determining unit, configured to determine, as the target display area, an area in which the target first cropping window overlaps with the to-be-transmitted image; and
a first recording unit, configured to record the target display area information.

In a possible implementation, the first determining unit includes;
a third cropping window obtaining unit, configured to obtain a third cropping window based on the request information;
an enlarging unit, configured to enlarge, based on the location information of the M key points, a size of the current cropping window by a first value to obtain an enlarged cropping window;
a straight line obtaining unit, configured to obtain a first straight line;
a sliding window scanning unit, configured to perform, between first boundaries based on a preset step, sliding window scanning on a geometric center of the enlarged cropping window on the first straight line;
a first judging unit, configured to: after the sliding window scanning unit performs the sliding window scanning on the enlarged cropping window, determine whether the enlarged cropping window including the M key points exists;
a fourth determining unit, configured to determine, as the second area, the area in which the enlarged window including the M key points overlaps with the to-be-transmitted image; and
a second recording unit, configured to record information about the second area.

In a possible implementation, the first determining unit includes;
a reference point obtaining unit, configured to obtain a reference point in the to-be-transmitted image;
a calculating unit, configured to calculate distance values from the reference point to the M key points based on the location information of the M key points, to obtain M first distance values;
a key point selection unit, configured to select, as a target key point, a key point corresponding to a largest first distance value;
a cropping window determining unit, configured to determine the second cropping window based on the request information, the reference point, the target key point, and the first straight line;
a fifth determining unit, configured to determine, as the second area, the area in which the second cropping window overlaps with the to-be-transmitted image; and
a third recording unit, configured to record information about the second area.

In a possible implementation, the target display area determining unit includes:
a sixth determining unit, configured to determine, based on the request information and the location information of the M key points, that the target display area of the to-be-transmitted image is the to-be-transmitted image; and
a fourth recording unit, configured to record size information of the to-be-transmitted image.

According to a fourth aspect, an embodiment of this application provides an image processing apparatus. The image processing apparatus is a second device and includes:
a sending unit, configured to send request information to a first device;
a receiving unit, configured to receive target display area information sent by the first device;
an image processing unit, configured to process, based on the target display area information, the image transmitted by the first device into a target display image; and
a presenting unit, configured to present the target display image in the display area of the second device.

In a possible implementation, the image processing unit includes:
a first cropping unit, configured to: if the target display area is a second area, crop, based on the target display area information, the image transmitted by the first device, to obtain a cropped image; and
a first scaling unit, configured to scale, the cropped image based on a size of the target display area and a size of the display area of the second device, to obtain the target display image; or
a second cropping unit, configured to: if the target display area is a second area, crop, based on the target display area information, the image transmitted by the first device, to obtain a cropped image; and
a second scaling unit, configured to crop the cropped image based on a size of the target display area and a size of the display area of the second device, to obtain the target display image; or
a third scaling unit, configured to: if the target display area is an area of the to-be-displayed image, scale, based on a size of the image transmitted by the first device and a size of the display area of the second device, the image transmitted by the first device, to obtain the target display image.

According to a fifth aspect, an embodiment of this application provides an image processing device. The image processing device is a first device and includes a memory and a processor.

The memory is configured to store program code, and the processor is configured to invoke the program code stored in the memory, to perform the image processing method according to the first aspect and the possible implementations of the first aspect.

According to a sixth aspect, an embodiment of this application provides an image processing device. The image processing device is a second device and includes a memory and a processor.

The memory is configured to store program code, and the processor is configured to invoke the program code stored in the memory, to perform the image processing method according to the second aspect and the possible implementations of the second aspect.

According to a seventh aspect, an embodiment of this application provides a computer-readable storage medium. The computer-readable storage medium stores a computer program. When the computer program is executed by a processor, the image processing method according to the first aspect and the possible implementations of the first aspect is implemented, or the image processing method according to the second aspect and the possible implementations of the second aspect is implemented.

According to an eighth aspect, an embodiment of this application provides a computer program. The computer program includes instructions. When the computer program is executed by a computer, the first device may be enabled to perform the procedure performed by the first device according to the first aspect and the possible implementations of the first aspect, or the second device may be enabled to perform the procedure performed by the second device according to the second aspect and the possible implementations of the second aspect.

According to a ninth aspect, an embodiment of this application provides a chip system. The chip system includes a processor, configured to support a first device in implementing the functions in the method according to the first aspect and the possible implementations of the first aspect, or a second device in implementing the functions in the method according to the second aspect and the possible implementations of the second aspect.

In a possible design, the chip system further includes a memory. The memory is configured to store program instructions and data that are necessary for the first device or the second device. The chip system may include a chip, or may include a chip and another discrete device.

BRIEF DESCRIPTION OF DRAWINGS

The following describes accompanying drawings used in embodiments of this application.

DESCRIPTION OF EMBODIMENTS

Figure 1:
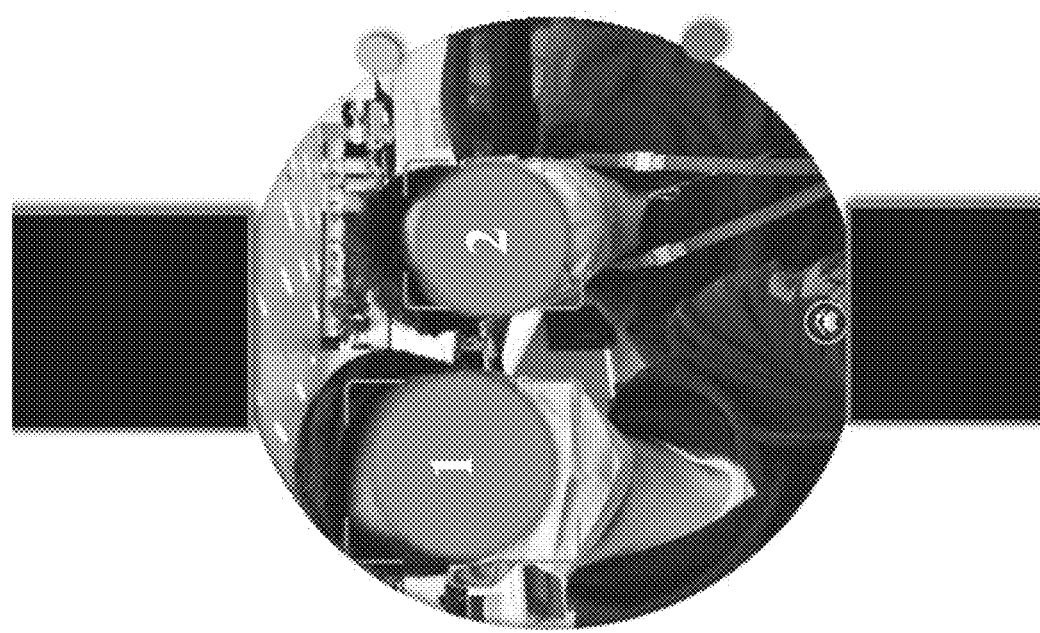
FIG. 1 is a schematic diagram of an image processing scenario according to an embodiment of this application.
Figure 1:
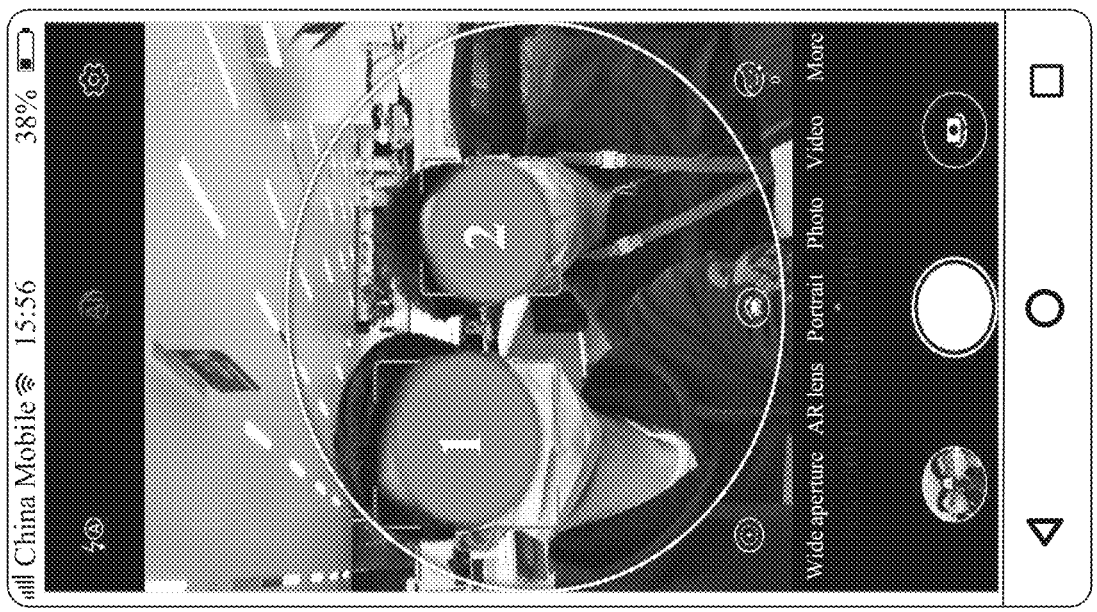

The following clearly and completely describes technical solutions in embodiments of this application with reference to accompanying drawings in embodiments of this application. It is clear that the described embodiments are merely some but not all of embodiments of this application. An "embodiment" mentioned in the specification means that a particular feature, structure, or characteristic described with reference to the embodiment may be included in at least one embodiment of embodiments of this application. The phrase shown in various locations in the specification is not necessarily a same embodiment, and is not an independent or optional embodiment exclusive from another embodiment. It can be explicitly and implicitly understood by a person skilled in the art that embodiments described in the specification may be combined with another embodiment. All other embodiments obtained by a person of ordinary skill in the art based on embodiments of this application without creative efforts shall fall within the protection scope of this application.

In the specification, the claims, and the accompanying drawings of this application, terms "first", "second", "third", and the like are intended to distinguish between different objects but do not indicate a particular order. In addition, terms "include", "have", and any other variants thereof are intended to cover non-exclusive inclusion. For example, a series of steps or units are included, or optionally an unlisted step or unit is included, or optionally another inherent step or unit of a process, a method, a product, or a device is included.

The accompanying drawings show only some but not all content related to this application. Before discussing example embodiments in more detail, it should be noted that some example embodiments are described as processing or methods depicted as flowcharts. Although the flowchart describes operations (or steps) as sequential processing, many of the operations can be performed in parallel, concurrently, or simultaneously. In addition, the sequence of the operations may be rearranged. The processing may be terminated when the operation is completed, but may further have additional steps that are not included in the figures. The processing may correspond to a method, a function, a procedure, a subroutine, a subprogram, or the like.

Terms such as "component", "module". "system", and "unit" used in this specification indicate computer-related entities, hardware, firmware, combinations of hardware and software, software, or software being executed. For example, a unit may be but is not limited to a process that runs on a processor, a processor, an object, an executable file, an execution thread, a program, and/or distributed between two or more computers. In addition, these units may be executed from various computer-readable media that store various data structures. For example, the units may perform communication by using a local and/or remote process and based on, for example, a signal having one or more data packets (for example, second unit data from another unit interacting with a local system, a distributed system, and/or across a network such as the Internet interacting with other systems by using the signal).

FIG. 1 is a schematic diagram of an image processing scenario according to an embodiment of this application. In FIG. 1, a smartphone is a first device, and a smart watch is a second device. After taking a selfie by using the smartphone (a display area is a rectangular screen), a first user transmits a photo obtained by photo taking to the smart watch. Because screen shapes of the smartphone and the smart watch (a display area is a circular screen) are different, a shape of the photo does not adapt to a shape of the smart watch, and display effect of the photo on the smart watch is poor, the smart watch processes the photo received by the smart watch, that is, crops the photo into a circle that adapts to the screen of the smart watch, and then presents the cropped photo to a second user on the smart watch. According to the method, best presentation effect of the photo can be achieved on the smart watch.

Figure 2:
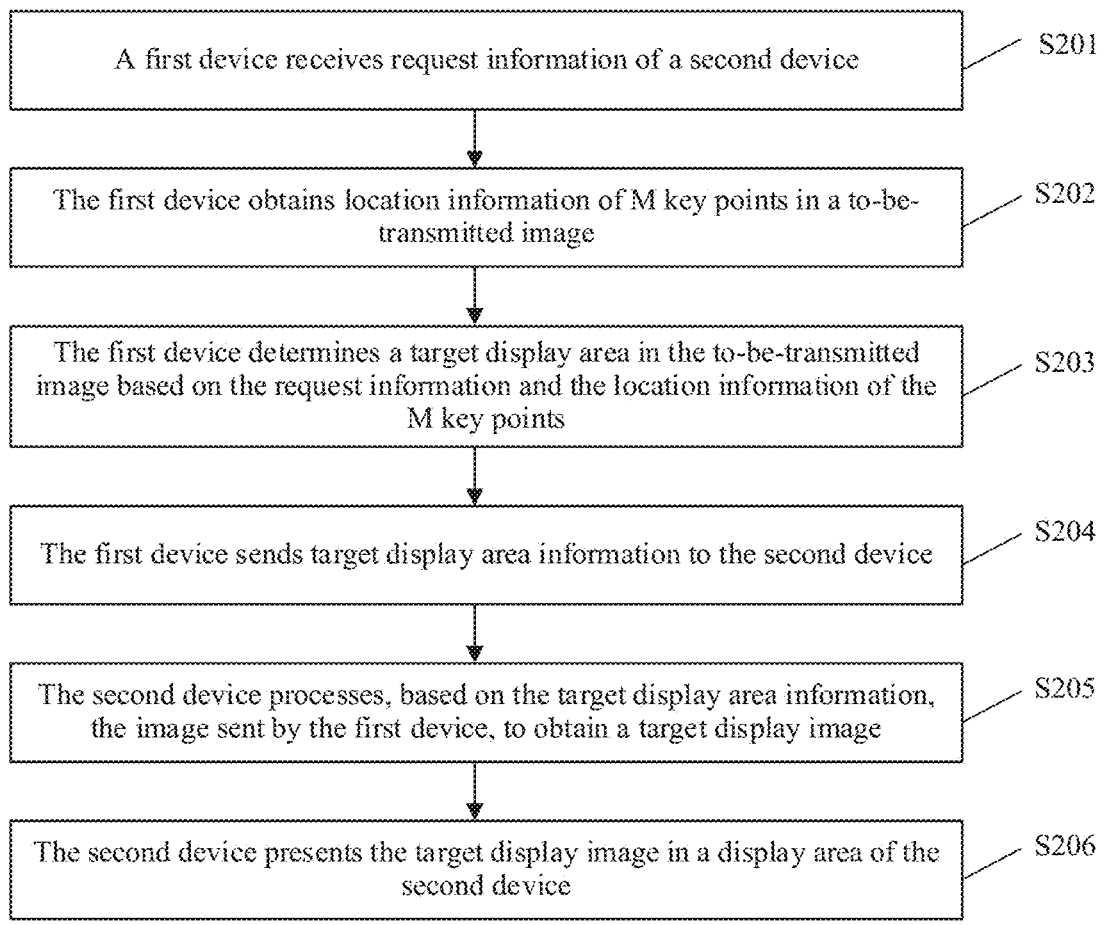
FIG. 2 is a schematic flowchart of image processing according to an embodiment of this application.

The following describes in detail an entire process and method of image processing with reference to FIG. 2. FIG. 2 is a schematic flowchart of image processing according to an embodiment of this application. As shown in FIG. 2, before transmitting an image to a target terminal, a source terminal configures a corresponding display policy for the to-be-transmitted image based on information about a display area of the target terminal and location information of key points of the to-be-transmitted image, so that visual presentation effect of the to-be-transmitted image on the target terminal is the best. In this embodiment of this application, an example in which the source terminal is a first device and the target terminal is a second device is used for description. A specific process of the image processing is as follows:

Step S201: The first device receives request information of the second device.

Specifically, before determining a target display area of the to-be-transmitted image, the first device needs to receive the request information of the second device. The request information includes information about a display area of the second device, and the information about the display area of the second device is obtained through interaction between the first device and the second device. The first device can determine a shape of a cropping window only after obtaining information such as a shape of the display area of the second device. The second device may be understood as a terminal that needs to display an image, for example, the smart watch in the foregoing embodiment. The display area information may include a shape, a size, and the like of a screen of the second device. The shape of the screen of the second device may be a circle, an ellipse, a heart shape, or the like. This is merely an example for description.

Step S202: The first device obtains location information of M key points in the to-be-transmitted image.

Specifically, the M key points in the to-be-transmitted image may be understood as points at which key information is located in the to-be-transmitted image. For example, if the key information is a face image of a user, the key points are center points of the face image, and when the key information is a fruit (when the key information is an apple), the key points are center points of the apple. Certainly, the key point may alternatively be a key area, and the key area may be an area in which the key information is located, for example, an area in which the face image of the user is located or an area in which the apple is located. This is merely an example for description, and does not constitute a specific limitation.

The location information of the key points may be obtained by using an image processing technology, for example, an image positioning technology or feature extraction. Certainly, the location information of the key points may alternatively be obtained in another manner. For example, the location information of the key points is obtained in a manner such as active marking by a user.

Step S203: The first device determines the target display area of the to-be-transmitted image based on the request information and the location information of the M key points.

Specifically, the first device determines the target display area of the to-be-transmitted image for the to-be-transmitted image based on the location information of the key points in the to-be-transmitted image and the information about the display area of the second device in the request information. The target display area is an area in which the to-be-transmitted image is displayed in the display area of the second device. The information about the display area of the second device is used to determine a shape of the target display area, and the location information of the key points is used to determine a size of the target display area and a location of the target display area in the to-be-transmitted image. After determining the target display area, the first device records target display area information. The target display area information includes size information of the target display area and location information of the target display area in the to-be-transmitted image. The shape, the size, and a specific location of the target display area in the to-be-transmitted image may be indicated by using the target display area information. In this embodiment of this application, the target display area is classified into three types based on a relationship between the target display area and the to-be-transmitted image. Each type of target display area corresponds to a display policy of the to-be-transmitted image in the second device. A process in which the first device records the target display area information is a process of configuring the display policy.

Figure 3:
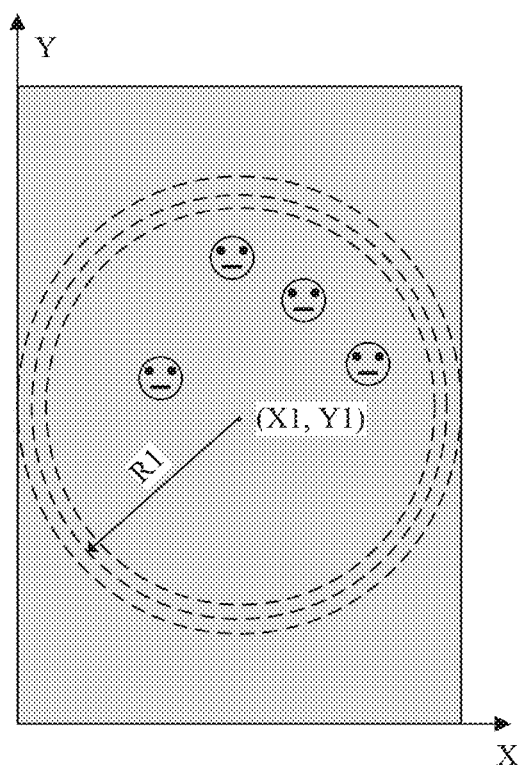
FIG. 3 is a schematic diagram of a first cropping window according to an embodiment of this application.

The first device determines the shape of the cropping window based on the information such as the shape of the display area of the second device in the request information, and the shape of the cropping window is the same as the shape of the target display area. For example, in the foregoing embodiment, the second device is the smart watch, and a display area (screen) of the second device is a circle. Therefore, only when the shape of the cropping window is the circle, it can be ensured that a shape (an overlapping area is the target display area) of an area in which the cropping window overlaps with the to-be-transmitted image fits the screen of the second device. The first device determines, based on the information about the display area of the second device and the location information of the M key points, whether a first cropping window that can include the M key points and that is completely covered by the to-be-transmitted image exists. If determining that the first cropping window that can include the M key points and that is completely covered by the to-be-transmitted image exists, the first device determines that the target display area is an area in which the first cropping window overlaps with the to-be-transmitted image, and the target display area is completely covered by the to-be-transmitted image. In this case, the first device may determine that the display policy of the to-be-transmitted image in the second device is a first display policy, and the first display policy indicates that the area in which the to-be-transmitted image is displayed on the second device is the area m which the first cropping window overlaps with the to-be-transmitted image. After determining the target display area, the first device records the target display area information such as the size information of the target display area and the location information of the target display area in the to-be-transmitted image, to complete configuration of the first display policy. As shown in FIG. 3, the display area of the second device is a circle, the key points of the to-be-transmitted image are faces, and the shape of the display area of the second device may be used to determine that the first cropping window is a circular cropping window. In FIG. 3, the first device determines, based on locations of the faces, that the circular cropping window exists in a rectangular to-be-transmitted image and can include all the faces in the to-be-transmitted image. Therefore, the first device determines that a display policy of the to-be-transmitted image in the second device is the first display policy, and the first display policy indicates that the display area of the to-be-transmitted image on the second device is a circular area in which the circular cropping window overlaps with the to-be-transmitted image. Then, the first device records information such as coordinate information (X1, Y1) of a pixel at which a center of the circular overlapping area is located and a radius R1 of the circular overlapping area, to complete the configuration of the first display policy. It should be noted that the shape of the cropping window is determined by the shape of the display area of the second device. Different second devices may correspond to different shapes of the cropping window, and shapes and locations of the target display area may also be different. Therefore, the target display area information only needs to be able to indicate the size of the target display area and the location of the target display area in the to-be-transmitted image. For example, in FIG. 3, the first device records the coordinate information (X1, Y1) of the pixel at which the center of the circular overlapping area is located and the radius R1 of the circular overlapping area to describe a specific size of the circular overlapping area and a specific location of the circular overlapping area in the to-be-transmitted image.

In a possible implementation, if a plurality of first cropping windows that can include the M key points exist in the to-be-transmitted image, the first device may select a first cropping window with a largest size from the plurality of first cropping windows as a target first cropping window, determine, as the target display area, an area in which the target first cropping window overlaps with the to-be-transmitted image, and record target display area information, to complete the configuration of the first display policy. For example, in FIG. 3, the first device may select a circular cropping window internally tangent to the to-be-transmitted image as the target first cropping window of the first device, to implement the configuration of the first display policy.

Figure 4:
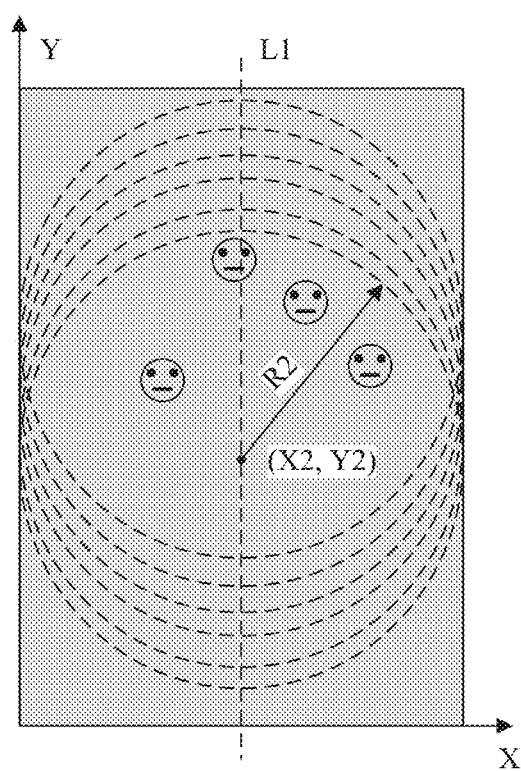
FIG. 4 is a schematic diagram of sliding scanning according to an embodiment of this application.

In a possible implementation, the first device may determine an optimal first cropping window by using a sliding window scanning method, and then configure the first display policy. The first device performs, between first boundaries of the to-be-transmitted image based on a preset step, the sliding window scanning on a geometric center of the first cropping window on a first straight line. The step may be a fixed value or may be a variable value, and may be obtained based on an empirical value or may be obtained based on historical data. The first straight line is a straight line that passes through a center point of the to-be-transmitted image in a first direction, and the first direction is a positive direction in which an image is presented in the display area of the second device. The optimal first cropping window is determined in many manners. For example, each time the first cropping window moves, the first device calculates first distance sets from the M key points to a center point of the moved first cropping window, and selects a first cropping window corresponding to a smallest first distance set as the optimal first cropping window. Alternatively, a first cropping window in which the M key points are concentrated and are located in an upper part of the moved first cropping window may be selected as the optimal first cropping window. This embodiment of this application is merely an example for description. For example, in FIG. 4, the sliding window scanning is performed downwards, along a first straight line L1, in a circular cropping window internally tangent to a to-be-transmitted image by K pixels each time. When coordinates of a center of the circular cropping window are (X2, Y2), a first distance set of the circular cropping window is the smallest. The circular cropping window whose center coordinates are (X2, Y2) is determined as the optimal first cropping window, an area in which the circular cropping window overlaps with the to-be-transmitted image is determined as the target display area, and target display area information such as center coordinate information (X2, Y2) and a radius R2 is recorded, to complete the configuration of the first display policy.

The first device determines, based on the information about the display area of the second device and the location information of the M key points, whether the first cropping window that can include the M key points and that is completely covered by the to-be-transmitted image exists. If the first device determines that the first cropping window that can include the M key points and that is completely covered by the to-be-transmitted image does not exist, the first device analyzes, based on the information about the display area of the second device and the location information of the M key points, whether a second cropping window that can include the M key points and that can be partially covered by the to-be-transmitted image exists. If the first device analyzes that the second cropping window that can include the M key points and that can be partially covered by the to-be-transmitted image exists, the first device determines that the target display area is an area in which the second cropping window overlaps with the to-be-transmitted image, and the target display area is partially covered by the to-be-transmitted image. In this case, the first device determines that the display policy of the to-be-transmitted image in the second device is a second display policy, and the second display policy indicates that the area in which the to-be-transmitted image is displayed on the second device is the area in which the second cropping window overlaps with the to-be-transmitted image. After determining the target display area, the first device records target display area information such as size information of the target display area and location information of the target display area in the to-be-transmitted image, to complete configuration of the second display policy. The second cropping window is determined mainly in two manners.

In a possible implementation, the first device determines, in the to-be-transmitted image based on the information such as the shape of the display area of the second device, a maximum cropping window that has a same shape as the display area of the second device and is covered by the to-be-transmitted image. The maximum cropping window is a third cropping window, and the third cropping window is a current cropping window. Then, the first device enlarges a size of the current cropping window by a first value, to obtain an enlarged cropping window, namely, the second cropping window. The first value may be fixed, or may be variable. The first value may be obtained based on experience, may be obtained based on history, or may be obtained based on a factor such as the location information of the key points. This is not limited in this embodiment of this application. Then, similar to the sliding window scanning performed on the first cropping window, the sliding window scanning is performed on the second cropping window, and whether a moved second cropping window can include the M key points is determined. If it is determined that the moved second cropping window can include the M key points, an area in which the moved second cropping window overlaps with the to-be-transmitted image is determined as the target display area, and target display area information is recorded, to complete the configuration of the second display policy. If it is determined that the moved second cropping window cannot include the M key points, the step of enlarging a size of the current cropping window by a first value, to obtain an enlarged cropping window is repeatedly performed, until the second cropping window that can include the M key points can be determined.

Figure 5:
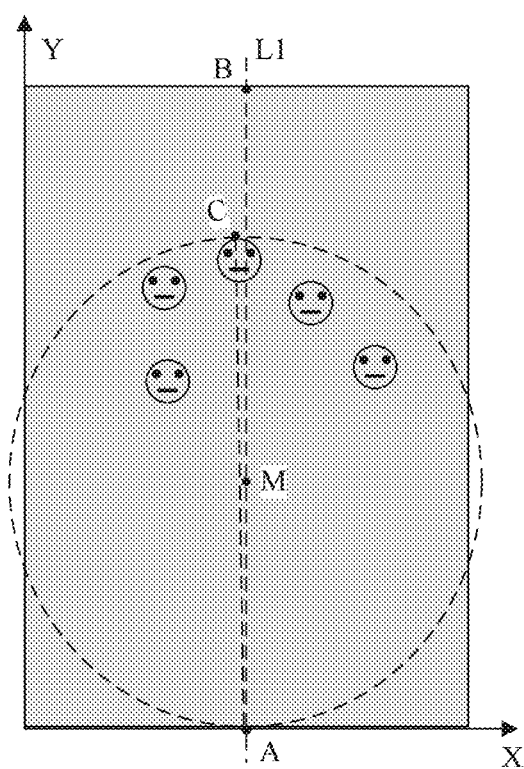
FIG. 5 is a schematic diagram of a second cropping window according to an embodiment of this application.

In a possible implementation, the first device determines a reference point of the to-be-transmitted image. The reference point is a first intersection point between a first straight line and a boundary of the to-be-transmitted image. The first intersection point may be obtained based on the location information of the key points, or may be obtained based on another factor such as optimal presentation effect of the to-be-displayed image. This is not limited in this embodiment of this application. Then, the first device calculates M first distance values from the M key points to the reference point based on locations of the M key points, and selects a key point with a largest first distance value as a target key point. The first device determines, based on the information such as the shape of the display area of the second device, location information of the reference point, location information of the target key point, and the first straight line, the second cropping window that has a same shape as the display area of the second device and can include the M key points, and a center point of the second cropping window is on the first straight line. Then, the first device determines, as the target display area, the area in which the second cropping window overlaps with the to-be-transmitted image, and records target display area information, to complete the configuration of the second display policy. As shown in FIG. 5, key points of a to-be-transmitted image are faces, a first straight line is L1, and there are two intersection points A and B between the straight line L1 and upper and lower boundaries of the to-be-displayed image in a vertical direction. Based on visual presentation effect (the key points should be below the target display area, so that visual effect of the target display area is good) of the image, the point A is determined as the first intersection point, and the point A is selected as the reference point. Then, the first device calculates distances between the faces in the to-be-transmitted image and the point A, and selects a face C with a maximum distance as the target key point. The first device determines a point M on the straight line L1, so that a longest distance between an edge of the face C and the point M and a distance between the point M and the point A are equal, so that a second cropping window whose center is M and radius R=AM can be determined.

If the first device analyzes, based on the information about the display area of the second device and the location information of the M key points, that the second cropping window that can include the M key points and that can be partially covered by the to-be-transmitted image does not exist, the first device determines that the display policy of the to-be-transmitted image in the second device is a third display policy, and the third display policy indicates that the area in which the to-be-transmitted image is displayed on the second device is the whole to-be-transmitted image.

Step S204: The first device sends the target display area information to the second device.

Step S205: The second device processes, based on the target display area information, the image transmitted by the first device, to obtain a target display image.

Figure 6:
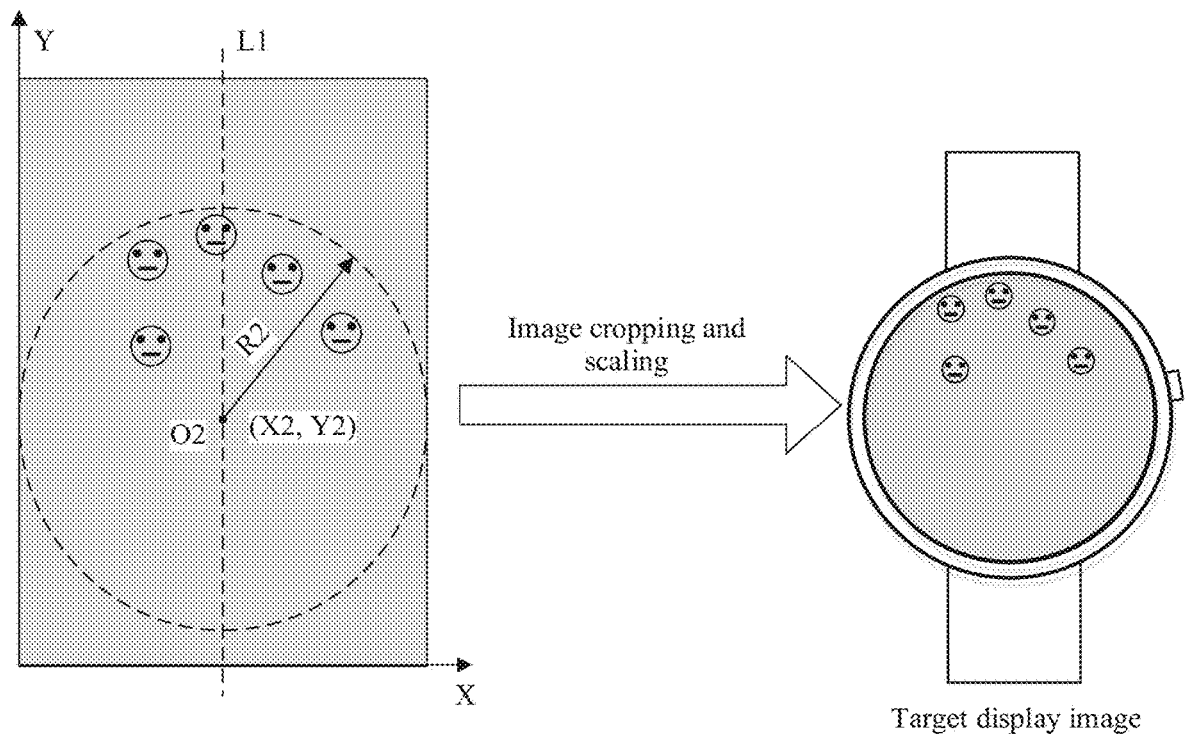
FIG. 6 is a schematic diagram of a target display image according to an embodiment of this application.

Specifically, after performing decoding on the image (the received image is sent by the first device) received by the second device, the second device processes the image based on the size information of the target display area and the location information of the target display area in the to-be-transmitted image in the target display area information, to obtain the processed target display image. When the display policy configured by the first device is the first display policy or the second display policy, the first device crops, based on the size information of the target display area and the location information of the target display area in the image received by the first device in the target display area information, the image decoded by the first device, to obtain a cropped image, and performs, based on the size of the display area of the second device, scaling on the cropped image to obtain the target display image. As shown in FIG. 6, the display policy configured by the first device is the first display area, and the target display area information includes coordinate information (X2, Y2) of a center O2 and a radius R2. The first device first finds, in the image decoded by the first device, a pixel whose coordinates are (X2, Y2), determines the pixel as a target pixel, makes a circle whose radius is R2 by using the pixel as a center, and retains an area in which the circle overlaps with the image. The overlapping area is the target display area of the image, and the obtained image is the cropped image. Then, the first device correspondingly scales the cropped image based on the screen size of the first device and a size of the cropped image, so that a ratio of the cropped image to the screen of the second device is 1:1, and the scaled image is the target display image.

When the display policy configured by the first device is the third display policy, because the target display area of the image decoded by the second device is the image received by the second device, the second device correspondingly scales, based on the size information of the image received by the second device and the size information of the screen of the second device, the image received by the second device, so that the screen of the second device is completely covered, and the scaled image is the target display image.

Step S206: The second device presents the target display image in the display area of the second device.

In this embodiment of this application, the first device configures, based on the information about the display area of the second device, the display policy for the to-be-transmitted image of the first device, and sends the target display area information to the second device, so that the second device can process the to-be-transmitted image by using the target display area information. The target display image that better fits the display area (such as the screen) of the second device is obtained, thereby providing better visual effect for the user. This resolves a problem that visual presentation effect is affected due to a failure that is of the image transmitted from the first device to the second device to adapt to the second device and that is caused by different display areas (for example, different screen shapes, different screen sizes, and different screen resolutions) of the first device and the second device.

The foregoing describes in detail the method in embodiments of this application. The following provides a related apparatus, a device, a computer-readable storage medium, a computer program, and a chip system in the embodiments.

Figure 7:
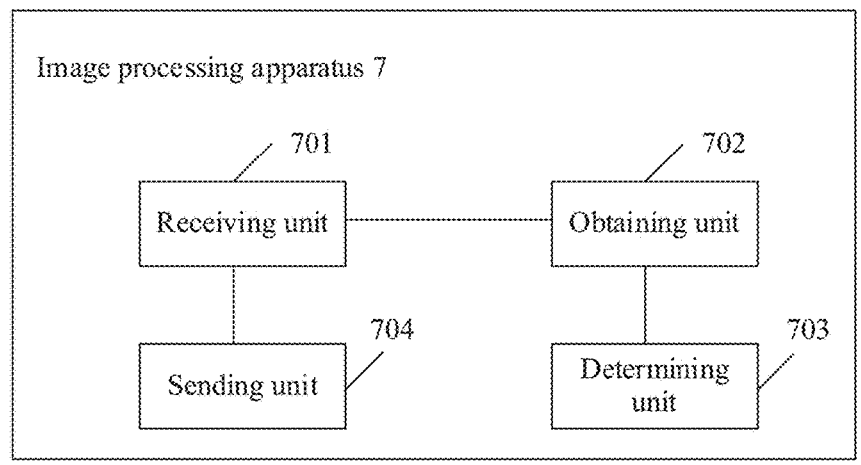
FIG. 7 is a schematic diagram of a structure of an image processing apparatus according to an embodiment of this application.

FIG. 7 is a schematic diagram of a structure of an image processing apparatus according to an embodiment of this application. An image processing apparatus 7 may be the first device in the foregoing embodiment, and the image processing apparatus 7 may include a receiving unit 701, an obtaining unit 702, a determining unit 703, and a sending unit 704. The units are described in detail as follows:

the receiving unit 701, configured to receive request information of a second device;

the obtaining unit 702, configured to obtain location information of M key points in a to-be-transmitted image;

the determining unit 703, configured to determine a target display area in the to-be-transmitted image based on the request information and the location information of the M key points, and the sending unit 704, configured to send target display area information to the second device, so that the second device processes the to-be-transmitted image into a target display image based on the target display area information.

In a possible implementation, the determining unit 703 includes:
- a judging unit, configured to determine whether one or more first cropping windows that can include the M key points exist in the to-be-transmitted image;
- a selection unit, configured to: after the judging unit determines that the one or more first cropping windows that can include the M key points exist in the to-be-transmitted image, select, as the target display area, a target first cropping window from the one or more first cropping windows that can include the M key points;
- an analyzing unit, configured to: after the judging unit determines that the one or more first cropping windows that can include the M key points do not exist in the to-be-transmitted image, analyze whether a second cropping window exists;
- a first determining unit, configured to: after the analyzing unit analyzes that the second cropping window exists, use, as the target display area, an area in which the second cropping window overlaps with the to-be-transmitted image; and
- a second determining unit, configured to: after the analyzing unit analyzes that the second cropping window does not exist, use an area of the to-be-transmitted image as the target display area.

In a possible implementation, the selection unit includes:
- a shape determining unit, configured to determine a shape of the first cropping window based on the request information;
- a third determining unit, configured to determine the one or more first cropping windows in the to-be-transmitted image based on the shape of the first cropping window and locations of the M key points;
- a first selection unit, configured to select a first cropping window with a largest size from the one or more first cropping windows as the target first cropping window;
- a target display area determining unit, configured to determine, as the target display area, an area in which the target first cropping window overlaps with the to-be-transmitted image; and
- a first recording unit, configured to record the target display area information.

In a possible implementation, the first determining unit includes;
- a third cropping window obtaining unit, configured to obtain a third cropping window based on the request information;
- an enlarging unit, configured to enlarge, based on the location information of the M key points, a size of the current cropping window by a first value to obtain an enlarged cropping window;
- a straight line obtaining unit, configured to obtain a first straight line;
- a sliding window scanning unit, configured to perform, between first boundaries based on a preset step, sliding window scanning on a geometric center of the enlarged cropping window on the first straight line;
- a first judging unit, configured to: after the sliding window scanning unit performs the sliding window scanning on the enlarged cropping window, determine whether the enlarged cropping window including the M key points exists;
- a fourth determining unit, configured to determine, as a second area, an area in which the enlarged window including the M key points overlaps with the to-be-transmitted image; and
- a second recording unit, configured to record information about the second area.

In a possible implementation, the first determining unit includes:
- a reference point obtaining unit, configured to obtain a reference point in the to-be-transmitted image;
- a calculating unit, configured to calculate distance values from the reference point to the M key points based on the location information of the M key points, to obtain M first distance values;
- a key point selection unit, configured to select, as a target key point, a key point corresponding to a largest first distance value;
- a cropping window determining unit, configured to determine the second cropping window based on the request information, the reference point, the target key point, and the first straight line;
- a fifth determining unit, configured to determine, as the second area, the area in which the second cropping window overlaps with the to-be-transmitted image; and
- a third recording unit, configured to record the information about the second area.

In a possible implementation, the target display area determining unit includes:
- a sixth determining unit, configured to determine, based on the request information and the location information of the M key points, that the target display area of the to-be-transmitted image is the to-be-transmitted image; and
- a fourth recording unit, configured to record size information of the to-be-transmitted image.

Figure 8:
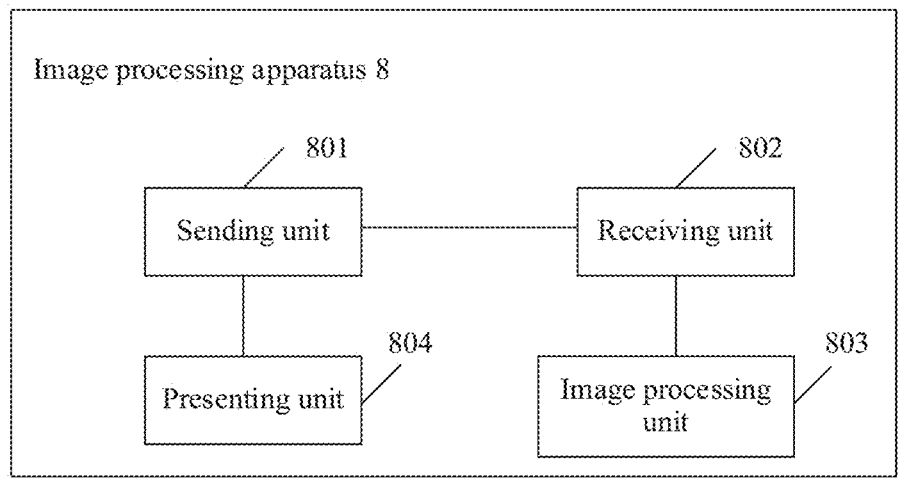
FIG. 8 is a schematic diagram of a structure of another image processing apparatus according to an embodiment of this application.

FIG. 8 is a schematic diagram of a structure of an image processing apparatus according to an embodiment of this application. An image processing apparatus 8 may be the second device in the foregoing embodiment, and the image processing apparatus 8 may include a sending unit 801, a receiving unit 802, an image processing unit 803, and a presenting unit 804. The units are described in detail as follows:
- the sending unit 801, configured to send request information to a first device;
- the receiving unit 802, configured to receive target display area information sent by the first device;
- the image processing unit 803, configured to process a to-be-transmitted image into a target display image based on the target display area information; and
- a presenting unit 804, configured to present the target display image in a display area of the second device.

In a possible implementation, the image processing unit 803 includes:
- a first cropping unit, configured to: if the target display area is a second area, crop, based on the target display area information, the image transmitted by the first device, to obtain a cropped image; and
- a first scaling unit, configured to scale, the cropped image based on a size of the target display area and a size of the display area of the second device, to obtain the target display image; or
- a second cropping unit, configured to: if the target display area is a second area, crop, based on the target display area information, the image transmitted by the first device, to obtain a cropped image; and a second scaling unit, configured to crop the cropped image based on a size of the target display area and the size of the display area of the second device, to obtain the target display image; or a third scaling unit, configured to: if the target display area is an area of the to-be-displayed image, scale, based on a size of the image transmitted by the first device and the size of the display area of the second device, the image transmitted by the first device, to obtain the target display image.

Figure 9:
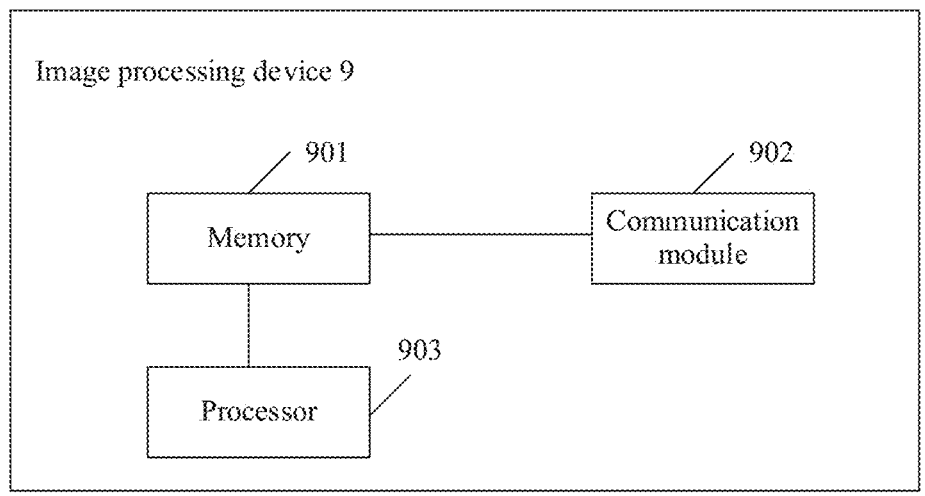
FIG. 9 is a schematic diagram of a structure of an image processing device according to an embodiment of this application.

FIG. 9 is a schematic diagram of a structure of an image processing device according to an embodiment of this application. An image processing device 9 may be the first device in the foregoing method embodiment, and the image processing device 9 may include a memory 901, a communication module 902, and a processor 903. The units are described in detail as follows:

The memory 901 is configured to store program code.

The processor 903 is configured to invoke the program code stored in the memory, to perform the following steps:
  receiving request information of a second device by using the communication module 902;
  obtaining location information of M key points in a to-be-transmitted image;
  determining a target display area in the to-be-transmitted image based on the request information and the location information of the M key points; and
  sending target display area information to the second device by using the communication module 902, so that the second device processes the to-be-transmitted image into a target display image based on the target display area information.

In a possible implementation, that the processor 903 determines the target display area in the to-be-transmitted image based on the request information and the location information of the M key points includes:
  determining whether one or more first cropping windows that can include the M key points exist in the to-be-transmitted image;
  if it is determined that the one or more first cropping windows that can include the M key points exist in the to-be-transmitted image, selecting, as the target display area, a target first cropping window from the one or more first cropping windows that can include the M key points; or
  if it is determined that the one or more first cropping windows that can include the M key points do not exist in the to-be-transmitted image, analyzing whether a second cropping window exists;
  if it is analyzed that the second cropping window exists, using, as the target display area, an area in which the second cropping window overlaps with the to-be-transmitted image, where the overlapping area is smaller than an area of the to-be-transmitted image; or
  if it is analyzed that the second cropping window does not exist, using the area of the to-be-transmitted image as the target display area.

In a possible implementation, that the processor 903 selects, as the target display area, the target first cropping window from the one or more first cropping windows that can include the M key points includes:
  determining a shape of the first cropping window based on the request information;
  determining the one or more first cropping windows in the to-be-transmitted image based on the shape of the first cropping window and locations of the M key points;
  selecting a first cropping window with a largest size from the one or more first cropping windows as the target first cropping window;
  determining, as the target display area, an area in which the target first cropping window overlaps with the to-be-transmitted image; and
  recording the target display area information.

In a possible implementation, that the processor 903 uses, as the target display area, the area in which the second cropping window overlaps with the to-be-transmitted image includes:
  obtaining a third cropping window based on the request information;
  enlarging, based on the location information of the M key points, a size of a current cropping window by a first value to obtain an enlarged cropping window;
  obtaining a first straight line;
  performing, between first boundaries based on a preset step, sliding window scanning on a geometric center of the enlarged cropping window on the first straight line, and determining whether the enlarged cropping window including the M key points exists; and if it is determined that the enlarged cropping window including the M key points does not exist, repeatedly performing the step of enlarging, based on the location information of the M key points, a size of a current cropping window by a first value to obtain an enlarged cropping window, until it is determined that the enlarged cropping window including the M key points exists;
  determining, as a second area, an area in which the enlarged window including the M key points overlaps with the to-be-transmitted image; and
  recording information about the second area.

In a possible implementation, that the processor 903 uses, as the target display area, the area in which the second cropping window overlaps with the to-be-transmitted image includes:
  obtaining a first straight line;
  obtaining a reference point in the to-be-transmitted image;
  calculating distance values from the reference point to the M key points based on the location information of the M key points, to obtain M first distance values;
  selecting, as a target key point, a key point corresponding to a largest first distance value;
  determining the second cropping window based on the request information, the reference point, the target key point, and the first straight line;
  determining, as a second area, the area in which the second cropping window overlaps with the to-be-transmitted image; and
  recording information about the second area.

In a possible implementation, that the processor 903 uses the area of the to-be-displayed image as the target display area includes:
  determining, based on the request information and the location information of the M key points, that the target display area of the to-be-transmitted image is the to-be-transmitted image; and
  recording size information of the to-be-transmitted image.

Figure 10:
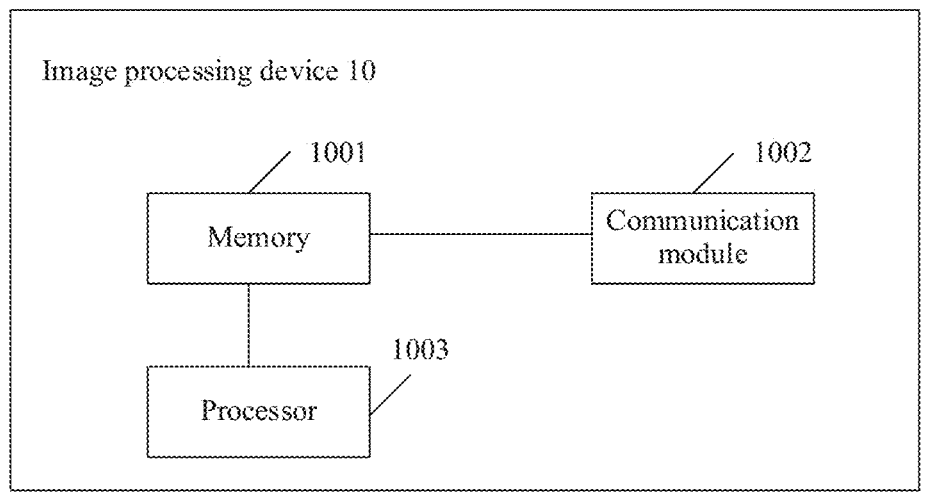
FIG. 10 is a schematic diagram of a structure of another image processing device according to an embodiment of this application.

FIG. 10 is a schematic diagram of a structure of an image processing device according to an embodiment of this application. An image processing device 10 may be the second device in the foregoing method embodiment, and the image processing device 10 may include a memory 1001, a communication module 1002, and a processor 1003. The units are described in detail as follows:

The memory 1001 is configured to store program code.

The processor 1003 is configured to invoke the program code stored in the memory, to perform the following steps:
  sending request information to a first device by using the communication module 1002;
  receiving target display area information sent by the first device by using the communication module 1002;
  processing a to-be-transmitted image into a target display image based on the target display area information; and
  presenting the target display image in a display area of the second device.

In a possible implementation, that the processor 1003 processes, based on the target display area information, the image transmitted by the first device into the target display image includes:

If the target display area is a target first cropping window, cropping, based on the target display area information, the image transmitted by the first device, to obtain a cropped image; and
  scaling the cropped image based on a size of the target display area and a size of the display area of the second device, to obtain the target display image; or
  if the target display area is a second area, cropping, based on the target display area information, the image transmitted by the first device, to obtain a cropped image; and
  scaling the cropped image based on a size of the target display area and a size of the display area of the second device, to obtain the target display image; or
  if the target display area is an area of the to-be-displayed image, scaling, based on a size of the image transmitted by the first device and a size of the display area of the second device, the image transmitted by the first device, to obtain the target display image.

An embodiment of this application provides a computer-readable storage medium. The computer-readable storage medium stores a computer program. When the computer program is executed by a processor, the image processing method in the foregoing embodiments and the possible implementations is implemented.

An embodiment of this application provides a computer program. The computer program includes instructions. When the computer program is executed by a computer, the first device may be enabled to perform the procedure performed by the first device in the foregoing embodiments and the possible implementations of the foregoing embodiments, or the second device may be enabled to perform the procedure performed by the second device in the foregoing embodiments and the possible implementations of the foregoing embodiments.

An embodiment of this application provides a chip system. The chip system includes a processor, configured to support a first device in implementing the functions in the method in the foregoing embodiments and the possible implementations of the foregoing embodiments, or a second device in implementing the functions in the method in the foregoing embodiments and the possible implementations of the foregoing embodiments.

In a possible design, the chip system further includes a memory. The memory is configured to store program instructions and data that are necessary for the first device or the second device. The chip system may include a chip, or may include a chip and another discrete device.

It should be noted that the memory in the foregoing embodiments may be a read-only memory (read-only memory, ROM) or another type of static storage device that can store static information and instructions, a random access memory (random access memory, RAM), or another type of dynamic storage device that can store information and instructions, or may be an electrically erasable programmable read-only memory (Electrically Erasable Programmable Read-Only Memory, EEPROM), a compact disc read-only memory (Compact Disc Read-Only Memory, CD-ROM) or another compact disc storage, an optical disc storage (including a compact optical disc, a laser disc, an optical disc, a digital versatile disc, a Blu-ray disc, or the like), a magnetic disk storage medium or another magnetic storage device, or any other medium that can be used to carry or store expected program code in a form of instructions or a data structure and that can be accessed by a computer. However, this is not limited thereto. The memory may exist independently, and is connected to the processor through a bus. The memory may be integrated with the processor.

The processor in the foregoing embodiments may be a general-purpose central processing unit (CPU), a microprocessor, an application-specific integrated circuit (application-specific integrated circuit, ASIC), or one or more integrated circuits configured to control execution of a program of the foregoing solution.

For brief description, the foregoing method embodiments are expressed as a series of actions. However, a person skilled in the art should appreciate that this application is not limited to the described order of the actions, because according to this application, some steps may be performed in other orders or simultaneously. In addition, it should be further appreciated by a person skilled in the art that embodiments described in this specification all belong to preferred embodiments, and the involved actions and modules are not necessarily required by this application.

In the several embodiments provided in this application, it should be understood that the disclosed apparatus may be implemented in other manners. For example, the described apparatus embodiment is merely an example. For example, division into the units is merely logical function division and may be other division in an actual implementation. For example, a plurality of units or components may be combined or integrated into another system, or some features may be ignored or not performed.

The units described as separate components may or may not be physically separate, and components displayed as units may or may not be physical units, may be located in one position, or may be distributed on a plurality of network units. Some or all of the units may be selected based on actual requirements to achieve the objectives of the solutions of embodiments.

In addition, functional units in embodiments of this application may be integrated into one processing unit, each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this application essentially, or the part contributing to the conventional technology, or all or some of the technical solutions may be implemented in a form of software. The computer software product is stored in a storage medium and includes several instructions for instructing a computer device (which may be a personal computer, a server, a network device, or the like, and may be specifically a processor in a computer device) to perform all or some of the steps of the method described in embodiments of this application. The storage medium may include any medium that can store program code, such as a USB flash drive, a removable hard disk, a magnetic disk, an optical disc, a read-only memory (read-only memory, ROM), or a random access memory (random access memory, RAM).

The foregoing embodiments are merely intended to describe the technical solutions of this application, but are not intended to limit this application. Although this application is described in detail with reference to the foregoing embodiments, a person skilled in the art should understand that the technical solutions described in the foregoing embodiments may still be modified or some technical features thereof may be equivalently replaced. These modifications or replacements do not enable essence of a corresponding technical solution to depart from the spirit and scope of the technical solutions of embodiments of this application.

What is claimed is:

1. A method for image processing implemented by a first device, wherein the method comprises:
   receiving request information from a second device, wherein the request information comprises first information about a display area of the second device;
   obtaining first location information of M key points in a to-be-transmitted image;
   setting a target display area in the to-be-transmitted image based on the request information and the first location information by:
      determining whether one or more first cropping windows exist in the to-be-transmitted image, wherein each of the one or more first cropping windows comprises the M key points, is completely covered by the to-be-transmitted image, and wherein a first shape of each of the one or more first cropping windows is the same as a second shape of the display area of the second device;
      selecting a target first cropping window from the one or more first cropping windows as the target display area when the one or more first cropping windows exist in the to-be-transmitted image;
      analyzing whether a second cropping window exists when the one or more first cropping windows do not exist in the to-be-transmitted image, wherein the second cropping window comprises the M key points and is partially covered by the to-be-transmitted image, and has a third shape that is the same as the second shape;
      setting a first area in which a second cropping window overlaps with the to-be-transmitted image as the target display area when the second cropping window exists, wherein the first area is smaller than a second area of the to-be-transmitted image; and
      setting the second area of the to-be-transmitted image as the target display area when the second cropping window does not exist; and
   sending target display area information to the second device, wherein the target display area information comprises first size information of the target display area and second location information of the target display area.

2. The method of claim 1, further comprising:
   determining the first shape based on the request information;
   determining the one or more first cropping windows in the to-be-transmitted image based on the first shape and locations of the M key points;
   selecting a first cropping window with a largest size from the one or more first cropping windows as the target first cropping window;
   setting a third area in which the target first cropping window overlaps with the to-be-transmitted image as the target display area; and
   recording the target display area information.

3. The method of claim 1, further comprising:
   obtaining a third cropping window based on the request information, wherein the third cropping window is a largest cropping window in the to-be-transmitted image, wherein a fourth shape of the third cropping window is the same as the second shape, and wherein the third cropping window is a current cropping window;
   enlarging, based on the first location information, a size of the current cropping window by a first value to obtain an enlarged cropping window, wherein the enlarged cropping window is the second cropping window;
   obtaining a first straight line that passes through a center point of the to-be-transmitted image in a first direction, wherein the first direction is a positive direction in which an image is presented in the display area;
   performing, between first boundaries based on a preset step, sliding window scanning on a geometric center of the second cropping window on the first straight line;
   determining whether the second cropping window exists;
   repeatedly performing enlarging, based on the first location information when the second cropping window does not exist, the size by the first value to obtain the enlarged cropping window until the second cropping window exists;
   setting a third area in which the second cropping window overlaps with the to-be-transmitted image as the first area; and
   recording second information about the first area, wherein the second information comprises second size information of the first area and third location information of the first area in the to-be-transmitted image.

4. The method of claim 1, further comprising:
   obtaining a first straight line that passes through a first center point of the to-be-transmitted image in a first direction, wherein the first direction is a positive direction in which an image is presented in the display area;
   obtaining a reference point in the to-be-transmitted image, wherein the reference point is a first intersection point between the first straight line and a boundary of the to-be-transmitted image;
   calculating distance values from the reference point to the M key points based on the first location information to obtain M first distance values;
   selecting a key point corresponding to a largest first distance value as a target key point;
   determining the second cropping window based on the request information, the reference point, the target key point, and the first straight line, wherein a second center point of the second cropping window is on the first straight line;
   determining a third area in which the second cropping window overlaps with the to-be-transmitted image as the first area; and
   recording second information about the first area, wherein the second information comprises second size information of the first area and third location information of the first area in the to-be-transmitted image.

5. The method of claim 1, further comprising:
determining, based on the request information and the first location information, that the target display area is the to-be-transmitted image; and
recording second size information of the to-be-transmitted image.

6. The method of claim 1, wherein the first information comprises a shape of the display area and a size of the display area.

7. The method of claim 1, further comprising:
identifying that the one or more first cropping windows exist in the to-be-transmitted image;
selecting, in response to identifying that the one or more first cropping windows exist in the to-be-transmitted image, a largest cropping window from the one or more first cropping windows; and
setting a third area in which the largest cropping window overlaps with the to-be-transmitted image as the target display area.

8. A first device comprising:
a memory configured to store instructions; and
a processor coupled to the memory and configured to invoke the instructions to cause the first device to:
  receive request information from a second device, wherein the request information comprises first information about a display area of the second device;
  obtain first location information of M key points in a to-be-transmitted image;
  set a target display area in the to-be-transmitted image based on the request information and the first location information by:
    determining whether one or more first cropping windows exist in the to-be-transmitted image, wherein each of the one or more first cropping windows comprises the M key points, is completely covered by the to-be-transmitted image, and wherein a first shape of each of the one or more first cropping windows is the same as a second shape of the display area of the second device;
    selecting a target first cropping window from the one or more first cropping windows as the target display area when the one or more first cropping windows exist in the to-be-transmitted image;
    analyzing whether a second cropping window exists when the one or more first cropping windows do not exist in the to-be-transmitted image, wherein the second cropping window comprises the M key points and is partially covered by the to-be-transmitted image, and has a third shape that is the same as the second shape;
    setting a first area in which a second cropping window overlaps with the to-be-transmitted image as the target display area when the second cropping window exists, wherein the first area is smaller than a second area of the to-be-transmitted image; and
    setting the second area of the to-be-transmitted image as the target display area when the second cropping window does not exist; and
  send target display area information to the second device, wherein the target display area information comprises first size information of the target display area and second location information of the target display area.

9. The first device of claim 8, wherein the processor is further configured to execute the instructions to cause the first device to:
  determine the first shape based on the request information;
  determine the one or more first cropping windows based on the first shape and locations of the M key points;
  select a first cropping window with a largest size from the one or more first cropping windows as the target first cropping window;
  set a third area in which the target first cropping window overlaps with the to-be-transmitted image as the target display area; and
  record the target display area information.

10. The first device of claim 8, wherein the processor is further configured to execute the instructions to cause the first device to:
  obtain a third cropping window based on the request information, wherein the third cropping window is a largest cropping window in the to-be-transmitted image, wherein a fourth shape of the third cropping window is the same as the second shape, and wherein the third cropping window is a current cropping window;
  enlarge, based on the first location information, a size of the current cropping window by a first value to obtain an enlarged cropping window, wherein the enlarged cropping window is the second cropping window;
  obtain a first straight line that passes through a center point of the to-be-transmitted image in a first direction, wherein the first direction is a positive direction in which an image is presented in the display area;
  perform, between first boundaries based on a preset step, sliding window scanning on a geometric center of the second cropping window on the first straight line;
  determine whether the second cropping window exists;
  when the second cropping window does not exist, repeatedly perform enlarging, based on the first location information, the size by the first value to obtain the enlarged cropping window until the second cropping window exists;
  determine a third area in which the second cropping window overlaps with the to-be-transmitted image as the first area; and
  record second information about the first area, wherein the second information comprises second size information of the first area and third location information of the first area in the to-be-transmitted image.

11. The first device of claim 8, wherein the processor is further configured to execute the instructions to cause the first device to:
  obtain a first straight line that passes through a first center point of the to-be-transmitted image in a first direction, wherein the first direction is a positive direction in which an image is presented in the display area;
  obtain a reference point in the to-be-transmitted image, wherein the reference point is a first intersection point between the first straight line and a boundary of the to-be-transmitted image;
  calculate distance values from the reference point to the M key points based on the first location information to obtain M first distance values;
  select a key point corresponding to a largest first distance value as a target key point;
  determine the second cropping window based on the request information, the reference point, the target key point, and the first straight line, wherein a second center point of the second cropping window is on the first straight line;
set a third area in which the second cropping window overlaps with the to-be-transmitted image as the first area; and
record second information about the second area, wherein the second information comprises second size information of the first area and third location information of the first area in the to-be-transmitted image.

12. The first device of claim 8, wherein the processor is further configured to execute the instructions to cause the first device to:
determine, based on the request information and the first location information, that the target display area is the to-be-transmitted image; and
record second size information of the to-be-transmitted image.

13. The first device of claim 8, wherein the first information comprises a shape of the display area and a size of the display area.

14. The first device of claim 8, wherein the processor is further configured to execute the instructions to cause the first device to:
identify that the one or more first cropping windows exist in the to-be-transmitted image;
select, in response to identifying that the one or more first cropping windows exist in the to-be-transmitted image, a largest cropping window from the one or more first cropping windows; and
set a third area in which the largest cropping window overlaps with the to-be-transmitted image as the target display area.

15. A computer program product comprising instructions stored on a non-transitory medium and that, when executed by a processor, cause a terminal device to:
receive request information from an external device, wherein the request information comprises first information about a display area of the external device;
obtain first location information of M key points in a to-be-transmitted image;
determine a target display area in the to-be-transmitted image based on the request information and the first location information by:
determining whether one or more first cropping windows exist in the to-be-transmitted image, wherein each of the one or more first cropping windows comprises the M key points, is completely covered by the to-be-transmitted image, and wherein a first shape of each of the one or more first cropping windows is the same as a second shape of the display area of the external device;
selecting a target first cropping window from the one or more first cropping windows as the target display area when the one or more first cropping windows exist in the to-be-transmitted image;
analyzing whether a second cropping window exists when the one or more first cropping windows do not exist in the to-be-transmitted image, wherein the second cropping window comprises the M key points and is partially covered by the to-be-transmitted image, and has a third shape that is the same as the second shape;
setting a first area in which a second cropping window overlaps with the to-be-transmitted image as the target display area when the second cropping window exists, wherein the first area is smaller than a second area of the to-be-transmitted image; and
setting the second area of the to-be-transmitted image as the target display area when the second cropping window does not exist; and
send target display area information to the external device, wherein the target display area information comprises first size information of the target display area and second location information of the target display area.

16. The computer program product of claim 15, wherein the instructions further cause the terminal device to:
determine the first shape based on the request information;
determine the one or more first cropping windows in the to-be-transmitted image based on the first shape and locations of the M key points;
select a first cropping window with a largest size from the one or more first cropping windows as the target first cropping window;
set a third area in which the target first cropping window overlaps with the to-be-transmitted image as the target display area; and
record the target display area information.

17. The computer program product of claim 15, wherein the instructions further cause the terminal device to:
obtain a third cropping window based on the request information, wherein the third cropping window is a largest cropping window in the to-be-transmitted image, wherein a fourth shape of the third cropping window is the same as the second shape, and wherein the third cropping window is a current cropping window;
enlarge, based on the first location information, a size of the current cropping window by a first value to obtain an enlarged cropping window, wherein the enlarged cropping window is the second cropping window;
obtain a first straight line that passes through a center point of the to-be-transmitted image in a first direction, wherein the first direction is a positive direction in which an image is presented in the display area;
perform, between first boundaries based on a preset step, sliding window scanning on a geometric center of the second cropping window on the first straight line;
determine whether the second cropping window exists;
repeatedly perform enlarging, based on the first location information when the second cropping window does not exist, the size by the first value to obtain the enlarged cropping window until the second cropping window exists;
set a third area in which the second cropping window overlaps with the to-be-transmitted image as the first area; and
record second information about the first area, wherein the second information comprises second size information of the first area and third location information of the first area in the to-be-transmitted image.

18. The computer program product of claim 15, wherein the instructions further cause the terminal device to:
obtain a first straight line that passes through a first center point of the to-be-transmitted image in a first direction, wherein the first direction is a positive direction in which an image is presented in the display area;
obtain a reference point in the to-be-transmitted image, wherein the reference point is a first intersection point between the first straight line and a boundary of the to-be-transmitted image;

calculate distance values from the reference point to the M key points based on the first location information to obtain M first distance values;
select a key point corresponding to a largest first distance value as a target key point;
determine the second cropping window based on the request information, the reference point, the target key point, and the first straight line, wherein a second center point of the second cropping window is on the first straight line;
determine a third area in which the second cropping window overlaps with the to-be-transmitted image as the first area; and
record second information about the first area, wherein the second information comprises second size information of the first area and third location information of the first area in the to-be-transmitted image.

* * * * *